(12) United States Patent
Atkinson et al.

(10) Patent No.: US 6,471,381 B2
(45) Date of Patent: Oct. 29, 2002

(54) LIGHTED VEHICLE BODY OPENING WEATHER STRIP

(75) Inventors: Arthur William Atkinson, Bloomfield Village, MI (US); Bruce Donald Burnside, Monroe, MI (US); Donald Paul Iacovoni, Plymouth, MI (US); David Arthur Wade, Plymouth Twp., MI (US); Jon W. Stanley, Dearborn, MI (US)

(73) Assignees: Ford Global Technologies, Inc., Dearborn, MI (US); The Standard Products Company, Dearborn, MI (US)

( * ) Notice: Subject to any disclaimer, the term of this patent is extended or adjusted under 35 U.S.C. 154(b) by 0 days.

(21) Appl. No.: 09/802,073

(22) Filed: Mar. 8, 2001

(65) Prior Publication Data

US 2002/0126498 A1 Sep. 12, 2002

(51) Int. Cl.$^7$ .............................. F21V 9/16; B60Q 1/00
(52) U.S. Cl. ..................... 362/501; 362/511; 362/84
(58) Field of Search ................................ 362/501, 511, 362/84, 554, 551

(56) References Cited

U.S. PATENT DOCUMENTS

| 4,494,326 | A  |   | 1/1985  | Kanamori |
|-----------|----|---|---------|----------|
| 4,934,753 | A  |   | 6/1990  | Gajewski |
| 5,122,933 | A  | * | 6/1992  | Johnson ..................... 362/511 |
| 5,193,895 | A  | * | 3/1993  | Naruke et al. ............... 362/501 |
| 5,564,813 | A  |   | 10/1996 | Curtin et al. |
| 5,692,327 | A  |   | 12/1997 | Wynne et al. |
| 5,826,378 | A  |   | 10/1998 | Gallas |
| 5,893,637 | A  | * | 4/1999  | Mizuno ........................ 362/84 |
| 6,037,865 | A  |   | 3/2000  | Heinz et al. |
| 6,152,588 | A  | * | 11/2000 | Scifres ....................... 362/554 |
| 6,190,027 | B1 | * | 2/2001  | Lekson ........................ 362/84 |
| 6,252,500 | B1 | * | 6/2001  | Chueh et al. ............... 362/501 |
| 6,273,433 | B1 | * | 8/2001  | Yu ............................... 277/629 |

* cited by examiner

Primary Examiner—Sandra O'Shea
Assistant Examiner—Peggy A Neils
(74) Attorney, Agent, or Firm—Gigett Bejin

(57) ABSTRACT

A lighted vehicle body opening weather strip includes a longitudinally extending gripping portion having an outside wall, a co-extending tubular sealing portion disposed on the outside wall of the gripping portion, a carrier embedded within the gripping portion, a light source extrusion carried by the gripping portion, and an extrusion solid surrounding the light source extrusion.

17 Claims, 2 Drawing Sheets

LIGHTED VEHICLE BODY OPENING WEATHER STRIP

FIELD OF THE INVENTION

The present invention relates to vehicle weather strips, and more specifically, to a lighted body opening weather strip.

BACKGROUND OF THE INVENTION

Weather strips are used to seal a door opening, such as in a motor vehicle body, and the door of the opening. Typically, weather strips are mounted onto a flange on the door and are made of a sponge rubber type material. Upon closure of the door, the weather strip is partially compressed between the flange of the door and the frame of the vehicle body so as to provide a barrier against ingress of draft, moisture, and outside noise. Certain vehicle body door openings also have a courtesy light source that is activated when the vehicle door is opened, so as to cast light below the opened door and ensure safe ingress and egress from the vehicle.

Because these two features are currently separate, they require extra installation processes, time, and cost, and it would therefore be beneficial to combine them. In addition, because weather strips are mounted onto the door, and because the light source typically does not light a large area, it would be beneficial to combine the two features so that when the door was opened, the light could be cast onto a large ground area to ensure a more safe entry and exit from the vehicle in low light conditions.

It is therefore desired to combine the advantages of a weather strip and a courtesy light source, ensuring safe ingress and egress from a vehicle and providing a barrier against moisture, noise, and draft, as well as eliminating the disadvantages of longer assembly time and higher part cost.

SUMMARY OF THE INVENTION

It is an object of the present invention to provide a lighted vehicle body opening weather strip that overcomes the disadvantages of the prior art.

It is a feature of the present invention that the lighted vehicle body opening weather strip incorporates a light source extrusion combined with an elastomeric weather strip extrusion.

The present invention advantageously provides a lighted vehicle body opening weather strip including a longitudinally extending gripping portion having an outside wall, a co-extending tubular sealing portion disposed on the outside wall of the gripping portion, a carrier embedded within the gripping portion, a light source extrusion carried by the gripping portion, and an extrusion solid surrounding the light source extrusion.

BRIEF DESCRIPTION OF THE DRAWINGS

These and other objects, features, and advantages of the present invention will become apparent from a reading of the following detailed description with reference to the accompanying drawings, in which.

DESCRIPTION OF THE PREFERRED EMBODIMENT(S)

Figure 1:
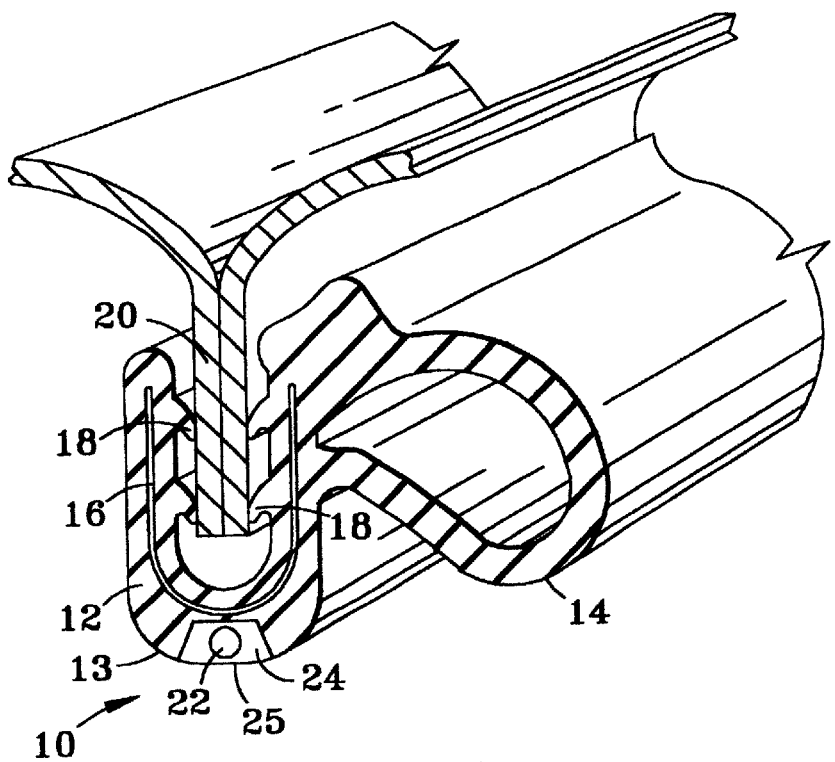
FIG. 1 is a perspective sectional view of a lighted vehicle body opening weather strip according to the present invention.

As shown in FIG. 1, a lighted vehicle body opening weather strip 10 is shown. The lighted vehicle body opening weather strip 10 comprises a longitudinally extending channel shaped gripping portion 12, on the outside wall of which is a co-extending tubular sealing portion 14. The tubular sealing portion 14 is preferably made of a sponge EPDM. The gripping portion 12 comprises a solid EPDM, in which is embedded a dense EPDM carrier 16. The gripping portion 12 has a plurality of gripping tongues 18 on the inside facing walls of the channel 12. The gripping tongues 18 are angled toward the bottom of the channel 12, and serve to secure the lighted vehicle body opening weather strip 10 onto the sheet metal flange of the vehicle door (not shown).

A fiber optical light source extrusion 22 is carried within the gripping portion 12, and extends longitudinally the length of the lighted vehicle body opening weather strip 10. The fiber optical light source extrusion 22 is surrounded by a translucent thermoplastic elastomer extrusion solid 24, preferably polyvinyl chloride. The translucent thermoplastic elastomer extrusion solid 24 has an outer surface 25 that is flush with the gripping portion's outer surface 13, thus resulting in an aesthetically pleasing uninterrupted profile, or contour. The fiber optical light source extrusion 22 is powered by a separate electrical source and the connection preferably covered by heat shrink tubing and a trim piece (not shown) as known in the art.

Figure 2:
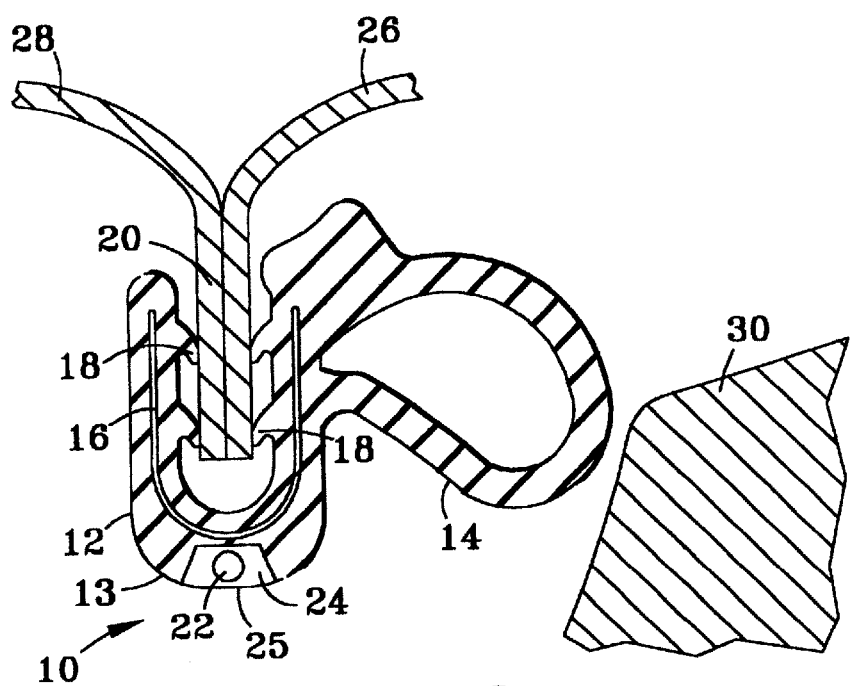
FIG. 2 is a cross-sectional view of a lighted vehicle body opening weather strip according to the present invention.

As shown in FIG. 2, when in use, the lighted vehicle body opening weather strip 10 is mounted around the frame of a door or other closable opening in a motor vehicle body by fitting the channel shaped gripping portion 12 onto the sheet metal flange 20, which extends around the opening and is formed where the inner and outer panels 26 and 28 of the bodywork are brought together. The configuration of the gripping portion 12 is such that it tightly grips the sheet metal flange 20, this gripping action being assisted by the gripping tongues 18. In this way, the gripping portion 12 supports the tubular sealing portion 14 so that the latter runs around the periphery of the opening and faces towards the body frame 30 of the vehicle. Upon closing the vehicle door, the tubular sealing portion 14 is partially compressed when it meets the body frame 30 of the vehicle, effectively providing a seal around the opening against moisture, draft, and noise.

When the vehicle door is opened, the tubular sealing portion 14 returns to its original uncompressed shape. Upon opening the door, the fiber optical light source extrusion 22 is illuminated by the electrical source. The fiber optical light source extrusion 22 casts light through the translucent thermoplastic elastomer extrusion 24 along the entire length of the lighted vehicle body opening weather strip 10, thus providing light along the entire door length to ensure safe ingress and egress from the vehicle.

Figure 3:
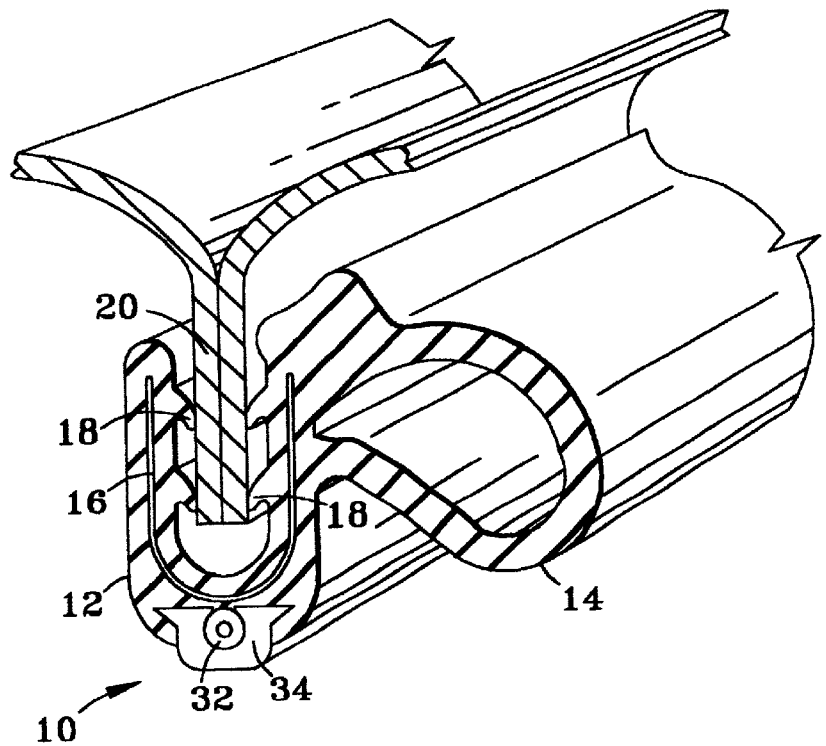
FIG. 3 is a perspective sectional view of an alternative embodiment of a lighted vehicle body opening weather strip according to the present invention.

FIG. 3 shows another embodiment of the lighted vehicle body opening weather strip 10. In this embodiment, the light source is an electrical luminescence wire 32. The electrical luminescence wire 32 extends longitudinally the length of the lighted vehicle body opening weather strip 10 and is held to the channel shaped gripping portion 12 by a clear polyvinyl chloride extrusion 34. The polyvinyl chloride extrusion 34 is horseshoe-shaped in cross-section and extends beyond the outer profile of the gripping portion 12. The electrical luminescence wire 32 is connected to a separate power source with the connection covered by heat shrink tubing and trim piece (not shown) as known in the art.

Figure 4:
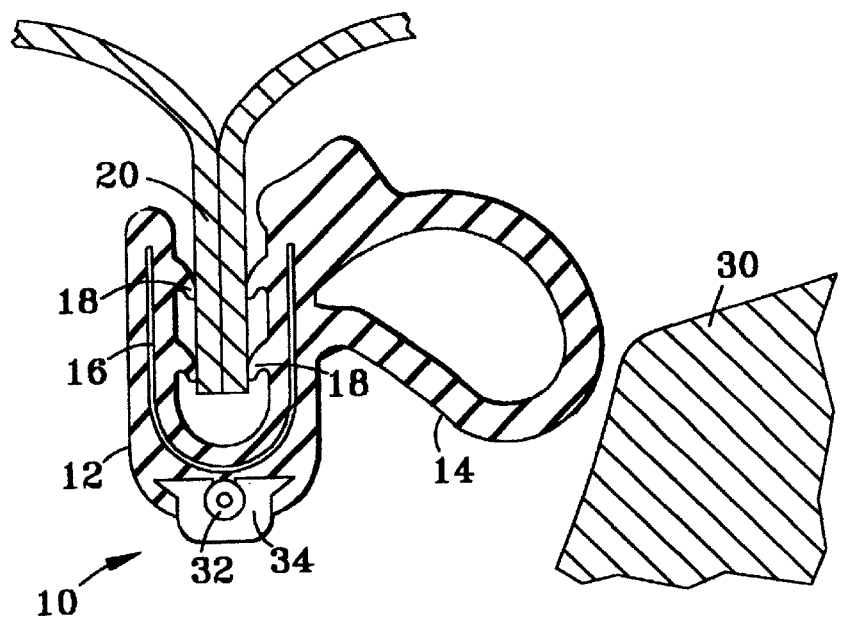
FIG. 4 is a cross-sectional view of an alternative embodiment of a lighted vehicle body opening weather strip according to the present invention.

In FIG. 4, like the first embodiment, when the door is opened, the electrical luminescence wire 32 is illuminated by the electrical source. The electrical luminescence wire 32 casts light through the clear polyvinyl chloride extrusion 34 along the entire length of the lighted vehicle body opening weather strip 10, thereby providing light along the entire door length to ensure safe ingress and egress from the vehicle.

While only certain embodiments of the lighted vehicle body opening weather strip of the present invention have been described, others may be possible without departing from the scope of the following claims.

What is claimed is:

1. A lighted vehicle body opening weather strip comprising:
   a longitudinally extending gripping portion having an outside wall;
   a co-extending tubular sealing portion disposed on the outside wall of the gripping portion;
   a carrier embedded within the gripping portion;
   a light source extrusion carried by the gripping portion; and
   an extrusion solid surrounding the light source extrusion.

2. The lighted vehicle body opening weather strip as defined in claim 1, wherein the gripping portion is a solid EPDM.

3. The lighted vehicle body opening weather strip as defined in claim 1, wherein the gripping portion has a plurality of gripping tongues.

4. The lighted vehicle body opening weather strip as defined in claim 1, wherein the tubular sealing portion is a sponge EPDM.

5. The lighted vehicle body opening weather strip as defined in claim 1, wherein the carrier is a dense EPDM.

6. The lighted vehicle body opening weather strip as defined in claim 1, wherein the light source extrusion is fiber optic.

7. The lighted vehicle body opening weather strip as defined in claim 1, wherein the extrusion solid surrounding the light source is a translucent thermoplastic elastomer.

8. A lighted weather strip for a vehicle door comprising:
   a longitudinally extending gripping portion having an outside wall and a predetermined length;
   a co-extending tubular sealing portion disposed on the outside wall of the gripping portion;
   a carrier embedded within the gripping portion;
   a light source extrusion carried by the gripping portion;
   an extrusion solid substantially surrounding the light source extrusion; and
   wherein the light source extrusion is illuminated upon opening of a vehicle door so the light is emitted along the predetermined length of the weather strip.

9. The lighted vehicle body opening weather strip as defined in claim 8, wherein the gripping portion is a solid EPDM.

10. The lighted vehicle body opening weather strip as defined in claim 8, wherein the gripping portion has a plurality of gripping tongues.

11. The lighted vehicle body opening weather strip as defined in claim 8, wherein the tubular sealing portion is a sponge EPDM.

12. The lighted vehicle body opening weather strip as defined in claim 8, wherein the carrier is a dense EPDM.

13. The lighted vehicle body opening weather strip as defined in claim 8, wherein the light source extrusion is an electrical luminescence wire.

14. The lighted vehicle body opening weather strip as defined in claim 8, wherein the extrusion solid substantially surrounding the light source is a clear polyvinyl chloride extrusion.

15. A lighted vehicle body opening weather strip comprising:
   a longitudinally extending gripping portion having an outside wall and an outer surface;
   a co-extending tubular sealing portion disposed on the outside wall of the gripping portion;
   a carrier embedded within the gripping portion;
   a light source extrusion carried by the gripping portion;
   an extrusion solid surrounding the light source extrusion and having an outer surface; and
   wherein the outer surface of the gripping portion and the outer surface of the extrusion solid are flush.

16. The lighted vehicle body opening weather strip as defined in claim 15, wherein the light source extrusion is fiber optic.

17. The lighted vehicle body opening weather strip as defined in claim 15, wherein the extrusion solid surrounding the light source is a translucent thermoplastic elastomer.

* * * * *